Nov. 3, 1953

C. R. HUSTON 2,657,712

FLOW REGULATOR

Filed Oct. 29, 1949

INVENTOR.
Charles R. Huston
BY
Norman C. H. Heletzke
Atty.

Patented Nov. 3, 1953

2,657,712

UNITED STATES PATENT OFFICE 2,657,712

FLOW REGULATOR

Charles R. Huston, Chicago, Ill., assignor to Cherry-Burrell Corporation, Wilmington, Del., a corporation Application October 29, 1949, Serial No. 124,385

2 Claims. (Cl. 138—43)

This invention relates to improvements in a flow regulator for treating fluids while passing therethrough.

Valves of the general type to which this invention pertains, when used for certain purposes, such, for example, as homogenizing of liquids or mixtures, etc., are sometimes referred to as homogenizing valves. The same type of valve may, however, also be utilized under certain conditions to destabilize the phase relationship of the ingredients in a fluid being treated, such, for example, as the destabilization of the phase relationship of an oil in water emulsion, wherein the oil content is relatively high.

Devices of the type which include the so-called "single service" homogenizing or liquid treating elements have a common defect. In most such devices, means are not provided for accurately positioning and supporting the homogenizing element during the period of assembly or during the period of adjustment of the device. Slight misadjustment or misalignment of these elements may seriously affect the efficiency of subsequent operation.

The primary purpose of the present invention, therefore, is to provide a relatively simple, sanitary, processing type valve, in which the fluid flow obstructing and flow disturbing element or elements may easily be installed and supported in a readily detachable manner on the complementary faces of the valve head and valve seat; in which the detachable fluid flow obstructing and flow disturbing elements are of simple design and are relatively inexpensive to produce; and in which the detachable fluid flow obstructing and flow disturbing elements are properly positioned by a detention and support element with respect to the associated parts of the valve.

Other objects and advantages of the invention may be apparent upon careful consideration of the following description of the preferred embodiment of the invention, selected for illustration. It will be understood, however, that various changes in form, construction, and arrangement may be made by those skilled in the art without departing from the spirit or the scope of the invention.

Figure 1:
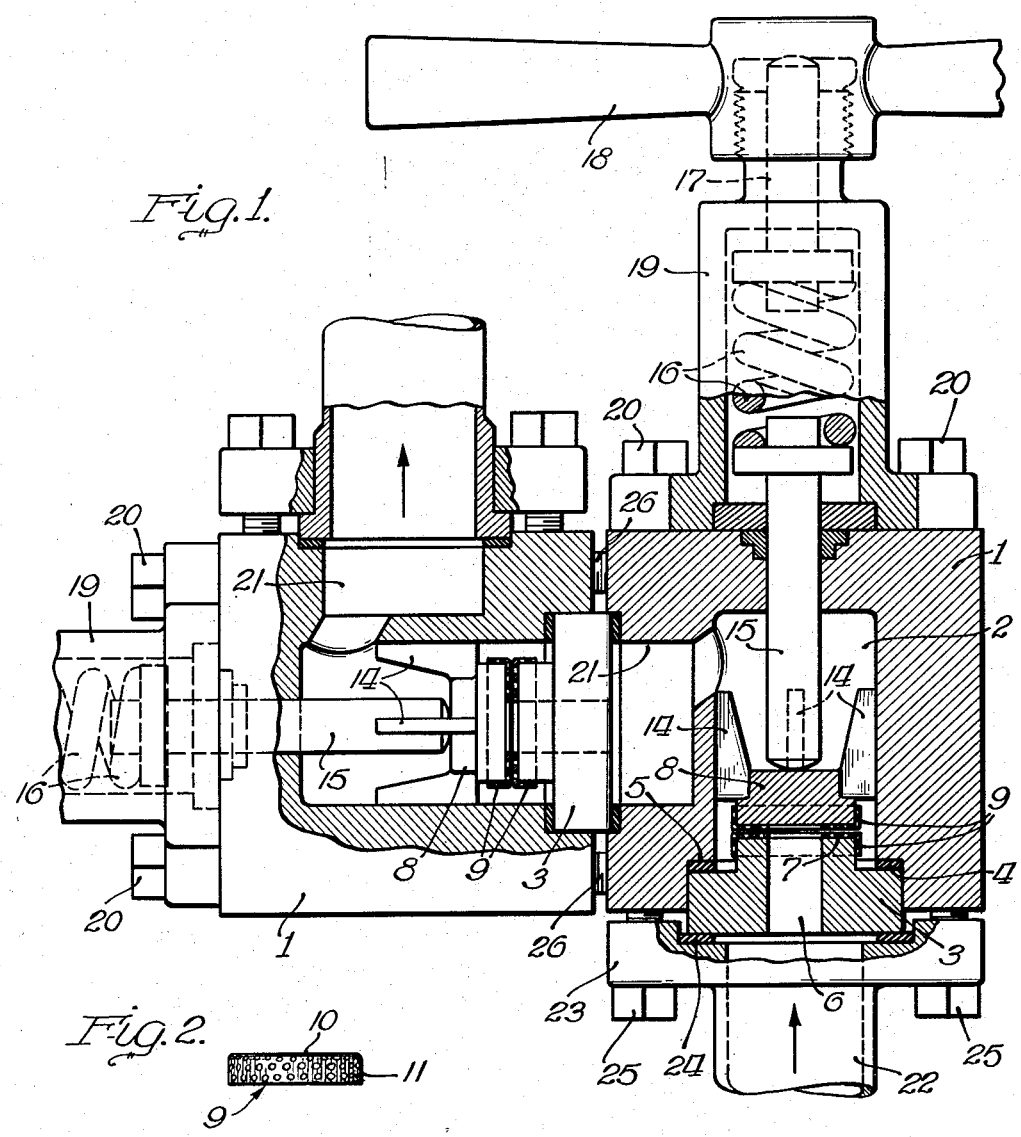
Figure 1 is an elevational view, partially in broken away section, of a device including two of the improved valves, constructed according to this invention.

In the drawings, 1 represents a valve casing, having a cylindrical valve chamber 2. A chamber closure 3 is snugly fitted into the enlarged opening of the end of the chamber 2. Closure 3 extends slightly beyond the outer surface of the casing 1. Gasket 4 is compressed between the closure 3 and shoulder 5 in the enlarged opening of the chamber 2, to thereby seal the chamber. Fluid inlet passage 6 extends through the closure 3 and opens at its inner end centrally of a substantially flat, circular valve seat 7, raised from the main body portion of the closure 3.

In Figure 1 of the drawings, the face of the valve seat 7 is at an angle of 90 degrees to the axis of the passage 6. The passage 6 is co-axial with the closure 3 and the chamber 2. Valve head 8, the flat lower face of which is complementary to the face of the valve seat 7, is also of substantially the same diameter as the valve seat 7 and is positioned immediately above and adjacent thereto. In the right-hand portion of Figure 1 of the drawings, the adjacent, flat faces of the seat 7 and head 8 are arranged horizontally, while the axis of the chamber 2 and the passage 6 are arranged vertically.

The valve seat 7 and the valve head 8 are each provided with a fluid flow obstructing and disturbing hood-like element 9, snugly fitted over and thereby detachably secured to and supported on the valve seat and valve head, respectively, with which they are associated. Element 9 includes a substantially flat, disk-like body portion 10, and a flange portion 11 which extends from the body portion 10 at an angle of substantially 90 degrees thereto and snugly and frictionally engages the complementary, cylindrical side surface of the associated seat or valve head. The body portion 10 of the element 9 includes a large, central port 12, of substantially the same diameter as the diameter of the inlet passage 6 in the closure 3. The elements 9 are preferably formed of material highly resistant to corrosion and erosion, such, for example, as stainless steel.

Figure 2:
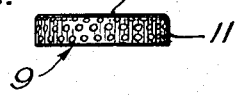
Figure 2 is an elevational view of a perforated, hood-like fluid flow obstructing and flow disturbing element adapted for use in the improved valve.
Figure 3:
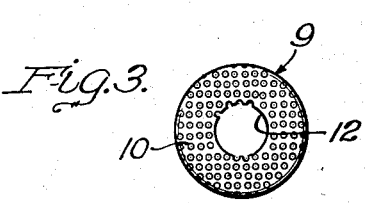
Figure 3 is a plan view of the element shown in Figure 2 of the drawings.
Figure 4:
Figure 4 is a sectional elevation of a modified, porous, hood-like, fluid flow obstructing and flow disturbing element, formed preferably of small particles of metal, such as metal particles securely bonded together.

The preferred arrangement contemplates the formation of the elements 9 from perforated sheet materials, as illustrated in Figure 2 or Figure 3 of the drawings. Porous material, such as fine, sintered metal particles, wherein the individual particles have been bonded together by heat and pressure, if necessary, may also be used for molding the fluid flow obstructing and flow disturbing elements, as illustrated by the modified type element 13 in Figure 4 of the drawings.

Flanges 11 of the elements 9 detachably secure and support the elements 9 in operative position upon the valve seat and valve head with which they are associated, properly centering the passages 12 with the fluid inlet 6, and in the chamber 2. The valve head 8 is provided with guide vanes 14, which align the valve head 8 with the axis of the chamber 2, and permit the axial, reciprocatory motion of the head 8.

Bearing upon the opposite face of the valve head 8 is a valve plunger or compression rod 15, which extends through a gasketed opening in the valve casing 1, and engages a spring 16, compressed by a plunger 17, secured to a valve adjustment lever 18, which, in turn, is threaded to a valve bonnet 19, operably secured as by screws 20 to the valve casing 1.

Casing 1 is provided with a lateral discharge port 21, through which the treated liquid is emptied from the chamber 2. The liquid to be treated is supplied to the fluid inlet passage 6 from any suitable, high pressure source, as, for instance, the conventional type of high pressure homogenizing pumps. From the pump, the fluid may be supplied to the inlet passage 6 through a suitable connection 22, which may be secured to the casing 1 by a flanged fitting 23, provided with a gasket 24, adapted to be compressed against the outwardly extending portion of the closure 3 upon the tightening of the screws 25.

In the embodiment of applicant's invention, illustrated in Figure 1 of the drawings, there is illustrated a combination of two of the improved liquid treating type of valves for acting in series upon the fluid being treated. Applicant's arrangement of valve casings, with the closure for the valve chamber extending slightly out of the valve casing and the provision of a countersunk, liquid discharge opening 21, adapts applicant's improved type of valve to ready assembly into a multiple unit, as illustrated in Figure 1 of the drawings.

The second valve casing in the left-hand portion of Figure 1 of the drawings is operatively secured to casing 1 at the right-hand portion of Figure 1 of the drawings, by any convenient manner, as, for example, by bolts 26. The outwardly extending portion of the valve chamber closure 3 for the left-hand valve assembly is seated into the countersunk opening of the treated liquid discharge opening 21 of the right-hand valve assembly and together with the use of suitable sealing gaskets, in the manner illustrated, forms a sealed juncture.

The left-hand portion of Figure 1 of the drawings, in substance, is a duplication of the right-hand portion of Figure 1 of the drawings, with the exception that the axis of the valve chamber of the left-hand portion of Figure 1 of the drawings is at an angle of 90 degrees to the axis of the valve chamber in the right-hand portion of Figure 1 of the drawings. Similarly, additional valves may be added, if desired, to produce still further processing effects upon the fluid being treated.

In the operation of a device constructed according to applicant's invention, the fluid to be treated is supplied under suitable pressure from supply pipe 22 through the inlet passage 6 into the space between the valve seat 7 and the valve head 8. The direction of flow of the liquid is suddenly changed by approximately 90 degrees at the instant the liquid leaves the inlet passage 6 and enters the space between the valve seat 7 and the valve head 8. It has been found that satisfactory results may be obtained if the valve seat 7 and valve face of valve head 8 are at an angle within 15 degrees from a perpendicular arrangement of the axis of the inlet passage 6.

Ports 12 in the flow obstructing elements 9 tend to uniformly distribute the liquid between the valve seat and valve head 7 and 8, respectively. The liquid tends to escape from the high pressure zone between the valve seat and valve head by flowing in between the substantially flat faces of the valve seat 7 and valve head 8 and the adjacent surfaces of the elements 9, carried by the valve seat and valve head.

Due to the perforated nature of the elements 9, when the perforated element 9 is used, the flow passage of the liquid is tortuous and obstructed. The flow of minute streams of liquid in between the substantially flat faces is frequently interrupted by impingement against and mixture with the substantially larger quantities of liquid entrapped in the perforations in the adjacent faces of the elements 9. The liquid flowing rapidly in film-like order over the surfaces of the elements 9 is subjected to the shearing effect of the sharp edges of the perforation in the elements 9 and to the excessive friction produced by contact with the surfaces of the elements 9 and the adjacent surfaces of the valve seat and valve head.

Substantially the same type of liquid treatment takes place when the liquid under high pressure is forced from the liquid inlet passage 6, through the porous element 13, when such porous element is used in place of the perforated elements 9 in the improved valve. The tortuous passages for fluid in between the surfaces of the element 13 and the adjacent surfaces of the valve seat and valve head, and in between the adjacent surfaces of small particles of metal, which have preferably been sintered together to form the element 13, produces, in substance, the same physical effect upon the ingredients of the fluid being treated.

After the fluid has passed through between the adjacent surfaces of the valve seat and valve head 7 and 8, respectively, it is discharged from the valve casing 1 through the opening 21.

Applicant's invention provides relatively inexpensive, highly efficient fluid flow obstructing and disturbing elements, for use in a valve type fluid processing device. The improved elements are so constructed as to reduce to a minimum the task of assembling the elements in the device, as well as to assure the retention of the elements in operative position during the adjustment of the device.

Although the applicant has referred particularly to the preferred type of construction of fluid flow obstructing and disturbing means 9 as being formed of perforated sheet metal, and has mentioned an alternative construction, wherein the fluid flow obstructing and disturbing element may be of porous material, such as sintered particles of metal, obviously other arrangements may also be used. The fluid flow obstructing and disturbing elements may, for example, if desired, be formed of finely woven wire, which has been formed into a hood-like shape comparable to that illustrated in Figures 2 and 3 of the drawings.

Although the preferred embodiment of the invention has been particularly shown and described, it will be understood that the invention is capable of modification, in that changes in construction and arrangement of the various parts may be made without departing from the spirit and scope of the invention.

The invention is claimed as follows:

1. A homogenizing valve comprising in combination a valve seat, a valve head opposed thereto, and cooperating therewith, and fluid flow obstructing and disturbing means interposed between said seat and said head, said means comprising two perforated members, one of which is removably secured to said valve seat and the other of which is removably secured to said valve head.

2. A homogenizing valve comprising in combination a valve seat, a valve head opposed thereto, and cooperating therewith, and fluid flow obstructing and disturbing means, said valve seat being provided with a central bore for supplying liquid to be treated, and said fluid flow obstructing and disturbing means being provided with a central port substantially aligned with and of substantially the same cross sectional size as said central bore, said valve seat being at an angle of substantially 90 degrees to the axis of said central bore.

CHARLES R. HUSTON.

References Cited in the file of this patent

UNITED STATES PATENTS

| Number | Name | Date |
|---|---|---|
| 1,694,838 | Bayha | Dec. 11, 1928 |
| 1,925,786 | Brooks | Sept. 5, 1933 |
| 1,948,503 | Bijur | Feb. 27, 1934 |
| 1,983,227 | Hall et al. | Dec. 4, 1934 |
| 2,304,689 | Hanson | Dec. 8, 1942 |
| 2,515,394 | Clarkson | July 18, 1950 |